US007925623B2

(12) United States Patent
Therrien et al.

(10) Patent No.: US 7,925,623 B2
(45) Date of Patent: Apr. 12, 2011

(54) METHOD AND APPARATUS FOR INTEGRATING PRIMARY DATA STORAGE WITH LOCAL AND REMOTE DATA PROTECTION

(75) Inventors: David G. Therrien, Nashua, NH (US); James E. Pownell, Natick, MA (US); Herman Robert Kenna, Harvard, MA (US); Adrian VanderSpek, Worcester, MA (US); Thomas G. Hansen, Bellingham, MA (US); Ashok T. Ramu, Waltham, MA (US); Cory Lee Sawyer, Hudson, MA (US)

(73) Assignee: Exagrid Systems, Inc., Westboro, MA (US)

( * ) Notice: Subject to any disclaimer, the term of this patent is extended or adjusted under 35 U.S.C. 154(b) by 785 days.

(21) Appl. No.: 10/659,129

(22) Filed: Sep. 10, 2003

(65) Prior Publication Data

US 2004/0088331 A1 May 6, 2004

Related U.S. Application Data

(60) Provisional application No. 60/409,684, filed on Sep. 10, 2002.

(51) Int. Cl.
*G06F 7/00* (2006.01)
*G06F 17/00* (2006.01)
(52) U.S. Cl. ........ 707/610; 707/620; 707/638; 707/640; 707/646; 707/665
(58) Field of Classification Search .................. 707/200, 707/202, 204; 709/321; 714/6; 711/162
See application file for complete search history.

(56) References Cited

U.S. PATENT DOCUMENTS

| 5,155,845 A | 10/1992 | Beal et al. ..................... 395/575 |
| 5,379,418 A | 1/1995 | Shimazaki et al. ........... 395/575 |
| 5,544,347 A | 8/1996 | Yanai et al. ................... 395/489 |
| 5,564,037 A | 10/1996 | Lam ............................... 395/488 |
| 5,633,999 A | 5/1997 | Clowes et al. ........... 395/182.04 |
| 5,684,991 A * | 11/1997 | Malcolm ....................... 707/204 |
| 5,737,763 A * | 4/1998 | Hilditch ....................... 711/162 |
| 5,764,972 A | 6/1998 | Crouse et al. ................. 395/601 |
| 5,778,395 A | 7/1998 | Whiting et al. .............. 707/204 |
| 5,813,017 A | 9/1998 | Morris .......................... 707/204 |
| 5,852,713 A | 12/1998 | Shannon ................. 395/182.04 |
| 5,857,112 A | 1/1999 | Hashemi et al. ............. 395/828 |
| 5,893,919 A | 4/1999 | Sarkozy et al. ............... 711/114 |

(Continued)

FOREIGN PATENT DOCUMENTS

EP 0 520 459 A2 12/1992

OTHER PUBLICATIONS

Santry et al. "Deciding when to forget in the Elephant File System", 1999, "Proceedings of the seventeenth ACM symposium on Operating Systems Principles", pp. 110-123.*

(Continued)

*Primary Examiner* — Charles Rones
*Assistant Examiner* — Charles D Adams
(74) *Attorney, Agent, or Firm* — Mintz, Levin, Cohn, Ferris, Glovsky and Popeo, P.C.

(57) ABSTRACT

Embodiments of this invention provide primary magnetic disk data storage capacity to clients while at the same time making sure that client data is replicated locally and at an offsite location to protect from all forms of data loss.

23 Claims, 6 Drawing Sheets

Sample present invention deployment across data centers

U.S. PATENT DOCUMENTS

| | | | |
|---|---|---|---|
| 5,960,169 A | 9/1999 | Styczinski | 395/182.04 |
| 5,966,730 A | 10/1999 | Zulch | 711/162 |
| 6,023,709 A | 2/2000 | Anglin et al. | 707/204 |
| 6,073,209 A | 6/2000 | Bergsten | 711/114 |
| 6,088,694 A | 7/2000 | Burns et al. | 707/8 |
| 6,148,412 A * | 11/2000 | Cannon et al. | 714/6 |
| 6,163,856 A | 12/2000 | Dion et al. | 714/4 |
| 6,269,424 B1 | 7/2001 | Katsuragi et al. | 711/114 |
| 6,330,572 B1 | 12/2001 | Sitka | 707/205 |
| 6,389,427 B1 | 5/2002 | Faulkner | 707/104.1 |
| 6,393,516 B2 | 5/2002 | Johnson | 711/111 |
| 6,446,175 B1 | 9/2002 | West et al. | 711/162 |
| 6,453,339 B1 | 9/2002 | Schultz et al. | 709/206 |
| 6,460,054 B1 * | 10/2002 | Grummon | 707/204 |
| 6,546,404 B1 | 4/2003 | Davis et al. | 707/204 |
| 6,560,615 B1 * | 5/2003 | Zayas et al. | 707/202 |
| 6,643,795 B1 | 11/2003 | Sicola et al. | 714/6 |
| 6,847,982 B2 * | 1/2005 | Parker et al. | 707/200 |
| 2002/0055972 A1 * | 5/2002 | Weinman, Jr. | 709/203 |
| 2002/0059539 A1 | 5/2002 | Anderson | 714/6 |
| 2002/0095416 A1 | 7/2002 | Schwols | 707/10 |
| 2002/0107877 A1 | 8/2002 | Whiting et al. | 707/204 |
| 2003/0070001 A1 * | 4/2003 | Belknap et al. | 709/321 |
| 2003/0131278 A1 * | 7/2003 | Fujibayashi | 714/6 |

OTHER PUBLICATIONS

Burns, et al. "Efficient Distributed Backup with Delta Compression", 1997, ACM Press, Processings of the Fifth Workshop on I/O in Parallel and Distributed Systems, pp. 27-36.*

International Search Report for PCT/US03/28390, mailing date: Feb. 20, 2004.

Garcia-Molina, et al., 35$^{th}$ IEEE Computer Society International Conference, pp. 573-577 (1990).

Lyon, J., 35$^{th}$ IEEE Computer Society International Conference, pp. 562-567 (1990).

Mohan, et al., Proceedings of the 9$^{th}$ International Conference on Data Engineering, pp. 511-518 (1993).

European Search Report dated Jan. 31, 2008.

* cited by examiner

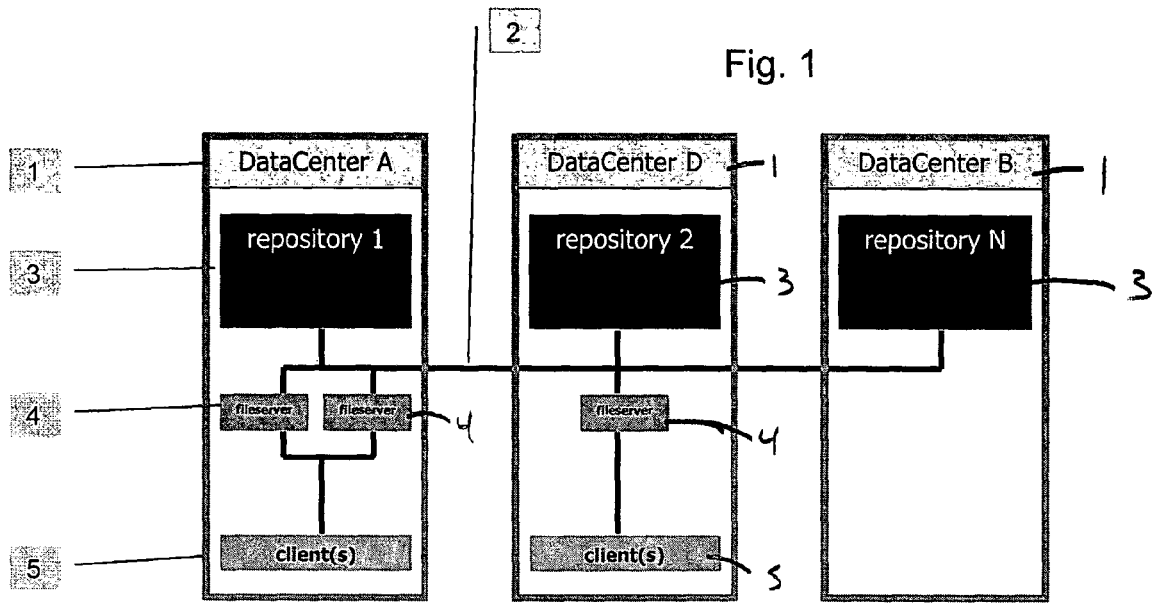
Figure 1: Sample present invention deployment across data centers
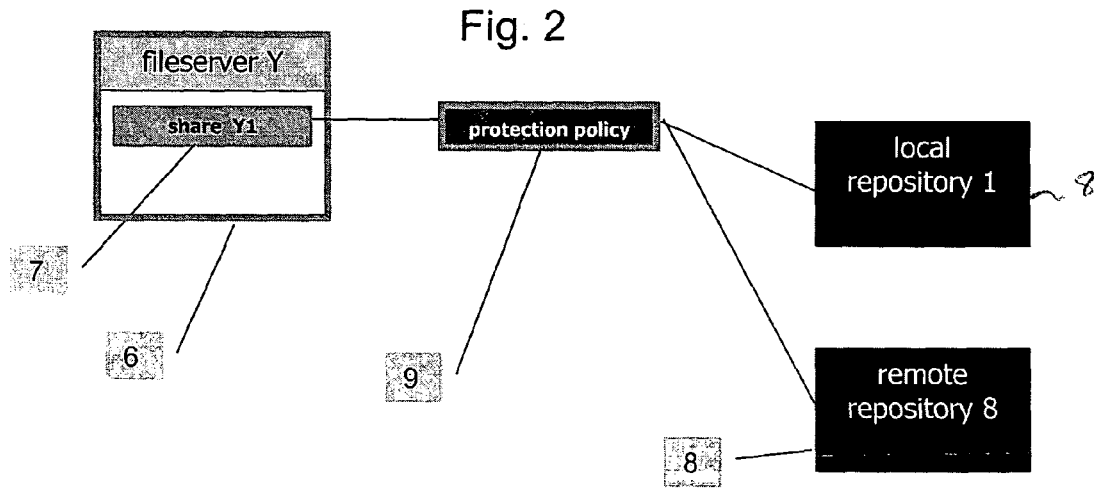
Figure 2: Association between fileserver shares and their repositories via protection policies Figure 3: Replication

Figure 4: Versioning

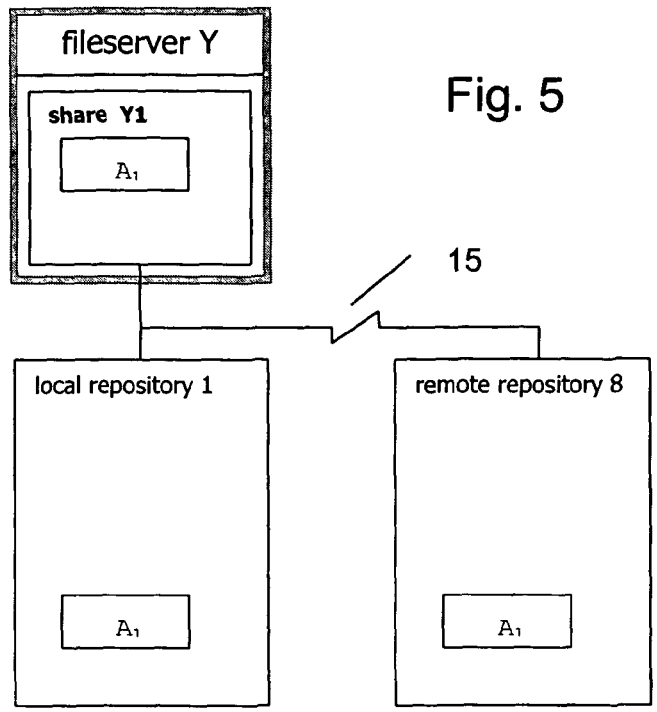
Figure 5 - Remote Replication with Delta Compression - Step 1
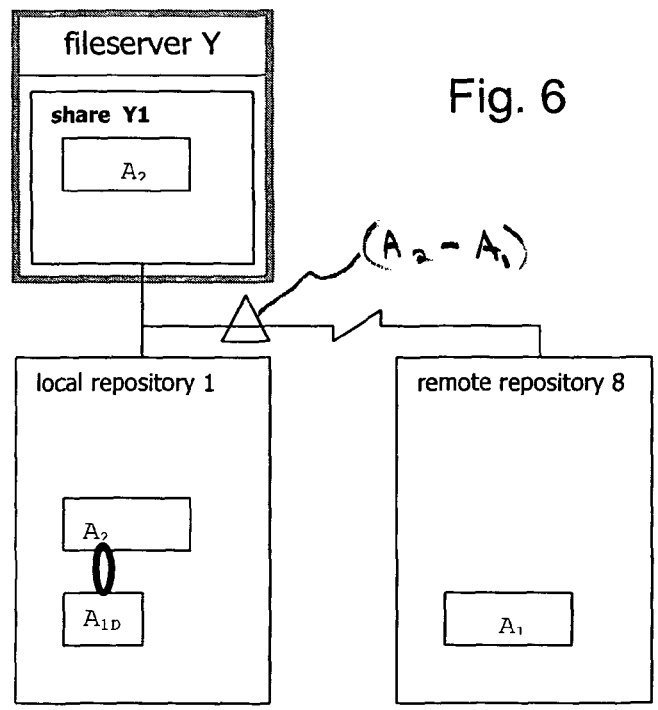
Figure 6 - Remote Replication with Delta Compression - Step 2

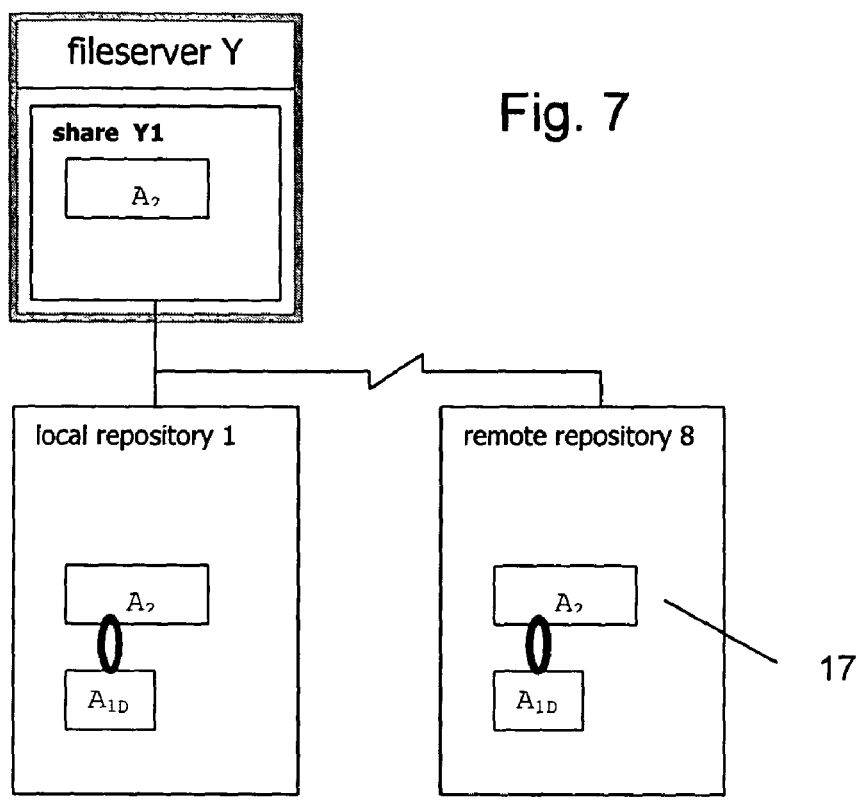
Figure 7- Remote Replication with Delta Compression - Step 3

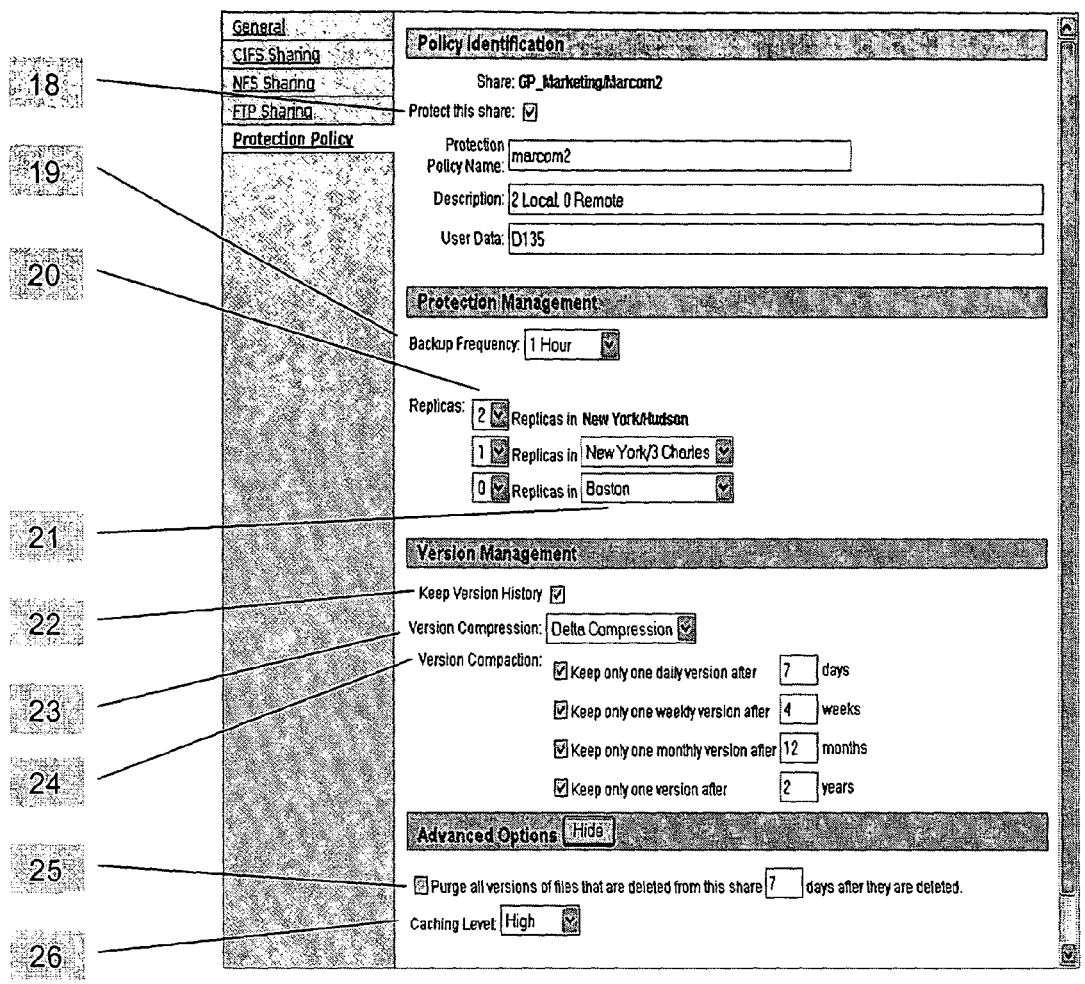
Fig 8. The present invention's protection policy

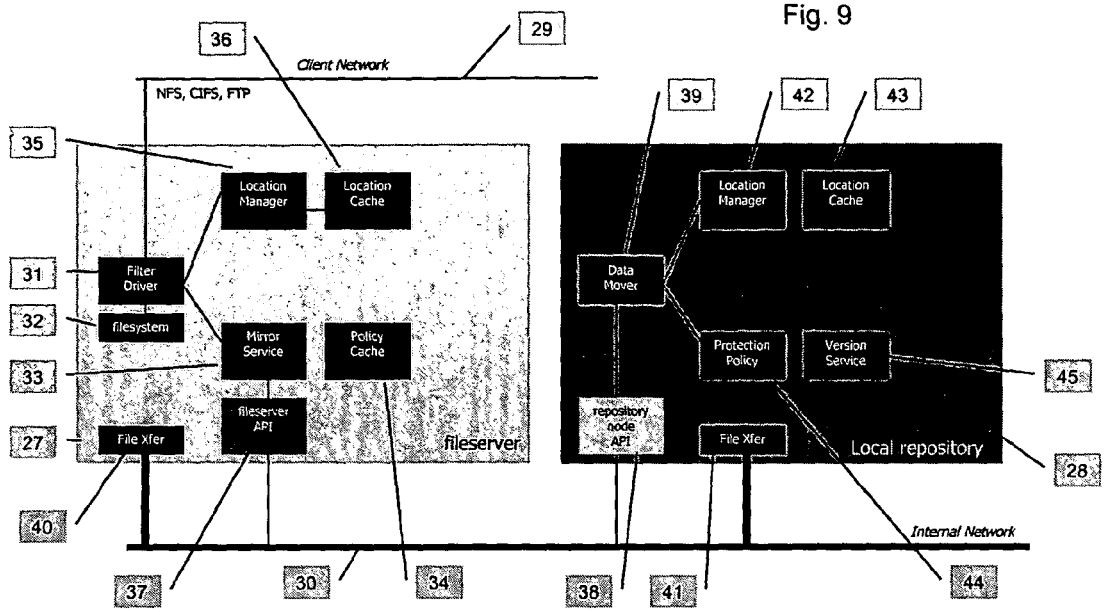
Fig 9. Apparatus and modules used to protect data to a local repository
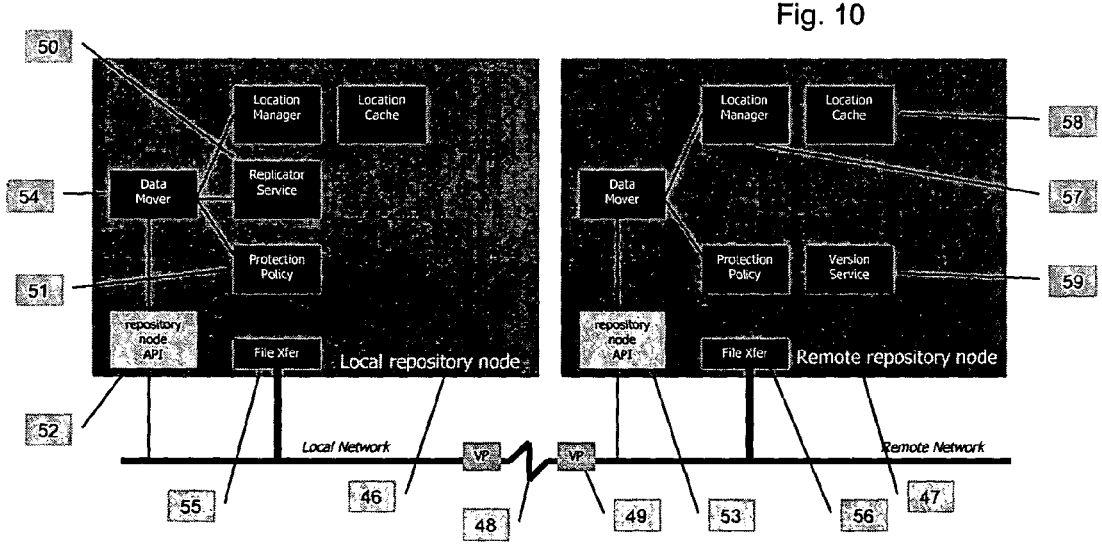
Fig 10. Inter-repository replication

METHOD AND APPARATUS FOR INTEGRATING PRIMARY DATA STORAGE WITH LOCAL AND REMOTE DATA PROTECTION

CROSS-REFERENCE TO RELATED APPLICATIONS

This application claims priority to, and the benefit of, U.S. Provisional Application Ser. No. 60/409,684 filed, Sep. 10, 2002, entitled "System and Method for Consolidated Storage and Data Protection," and incorporated herein by reference in its entirety. This application is also related to: U.S. patent application Ser. No. 10/658,978 filed Sep. 10, 2003, entitled ,"METHOD AND APPARATUS FOR STORAGE SYSTEM TO PROVIDE DISTRIBUTED DATA STORAGE AND PROTECTION" U.S. patent application Ser. No. 10/659,642 filed Sep. 10, 2003, entitled "METHOD AND APPARATUS FOR SERVER SHARE MIGRATION AND SERVER RECOVERY USING HIERARCHICAL STORAGE MANAGEMENT" and U.S. patent application Ser. No. 10/659,128 filed Sep. 10, 2003, entitled "METHOD AND APPARATUS FOR MANAGING DATA INTEGRITY OF BACKUP AND DISASTER RECOVERY DATA " each of which is incorporated herein by reference in its entirety.

BACKGROUND OF THE INVENTION

The present invention is associated with computer primary disk storage systems and the ongoing protection of data on that primary disk storage system from various forms of data loss or corruption. These forms of data loss include accidental user or application file deletion, virus attacks, hardware failure and/or the loss of a data center facility.

Primary disk storage systems must be periodically protected. While there are numerous data protection solutions available for protecting data, they suffer from the following problems:

- There are many data protection schemes that are employed in combination to fully protect data. The multiplicity of these schemes (e.g. RAID, snapshots, backup, replication) creates over-replication of primary data and increases the complexity of data recovery administration.
- The deployment of data storage and data protection systems today rarely extends beyond a single data center. This creates isolated islands of data storage, data protection and data management. This creates an environment where some data centers have a surplus of storage capacity that they cannot effectively share with other data centers that need additional storage capacity.
- Traditional data protection systems rely almost exclusively on magnetic tape because of its low cost. There are significant reliability and long-term integrity issues associated with reading data that has been recorded on magnetic tape. Tape media quality is degraded each time it is used in a tape drive due to friction between the medium surface and the tape drive head. In addition, tape media that is stored in an archive facility must be maintained within tight environmental limits of temperature and humidity. These limits are likely to be exceeded as tapes are transported from a company's air-conditioned data center into archive storage trucks and then back into air conditioning of the offsite storage facility. Observe the relatively limited temperature and humidity range for magnetic tapes that are stored in an archive environment.

|  | Magnetic Tape | Magnetic Disk |
| --- | --- | --- |
| Archive Temp (C.) | 18-28 degrees C. | −40 to 65 degrees C. |
| Archive Humidity (%) | 40-60% | 5-95% |

- Generations of tape media and tape drive technology regularly become obsolete, making long-term archiving using magnetic tape a significant challenge. A company with hundreds or thousands of magnetic tapes that were written on older generation tape drives must maintain one or more of these older tape drives to be able to access data on these older tapes.
- New computer applications and types of digital data are causing a 60% year over year increase in demand for primary disk storage capacity. While magnetic disk technology has kept pace with the demand for providing cost-effective, high capacity primary storage systems, magnetic tape has not. In 1986, magnetic tape was approximately 35 times less expensive than magnetic disk, but that cost advantage has eroded from 35× to approximately 2× at the present time. It is expected that this cost erosion will continue into the future, eventually making magnetic tape a more costly alternative to magnetic disk storage.
- Currently, each data storage system is made up of a collection of a dozen separate data storage, data protection and data management system and software components. Such systems experience interoperability problems among components. Each of the many components typically has its own management user interface that needs to be mastered by a storage administrator.
- With the multiplicity of data protection systems and components, such as RAID, snapshots, tape backup and file and block replication, it is difficult for a storage administrator to know how best to respond in the event of actual data loss.
- With today's data storage and data protection systems, one megabyte of primary storage data can generate from 10 megabytes to 50 megabytes of protected data. This over-replication of data comes from RAID redundancy drives, snapshot histories, multiple sets of weekly full backup tapes, daily incremental backup tape sets and block and file replication systems. For example, a company that retains just 3 months of weekly full backups will have replicated the data from the primary storage system about 13 times, since the data on successive weekly full backups is almost completely identical.
- Most disaster recovery systems in place today employ replication between just two specific storage subsystems. They don't provide a logical abstraction of virtual storage capacity to enable any primary storage resource to be protected by any other local or remote protection resource.
- There are many data replication products that are available today. Replication products, as they've been designed, replicate all changes between two systems. However an accidental deletion of a file from one of the systems in the replication set will cause the deletion to occur at the other replicated system(s). When this occurs, the data that was deleted must be recovered from backup tapes. Therefore, today's replication systems continue to rely on magnetic tape based backups for complete protection.
- Snapshot-based data protection has become popular since it provides end-users with the ability to recover files that they have deleted in the recent past. But snapshot systems cannot function as a replacement for traditional tape backup. Snapshots depend on the current version of a filesystem to be operational in order to recover earlier snapshot versions of files. Therefore, today's snapshot-based systems continue to rely on magnetic tape based backups for complete protection.

Standard weekly-full/daily incremental tape backup schedules today are designed around the long search times of traditional magnetic tape. During a data restore operation, a full tape is first loaded and then a number of incremental tapes must be loaded thereafter. It takes tens of minutes to search and recover the desired data item on each tape, so the standard weekly full backup model limits the number of tapes used in recovery to one full tape and at most 5 incremental tapes. If tape media latency could be eliminated from the data recovery process by leveraging the much faster seek and rotational delays of magnetic disk technology, full backups could be performed less frequently. For instance, a full backup may be taken once a month or once a quarter with incremental backups occurring daily between these full backups. When magnetic disk is used as a backup medium, the time to access and recover multiple weeks or months of incremental backup data from disk is thousands of times faster than traditional tape. Weekend full backup runs also strain networks and administrators in getting all of the primary storage data committed to magnetic tape before the weekend ends. As the amount of primary storage data grows, the time it takes to backup all of this additional primary storage grows proportionally.

The value of certain collections of data to the survivability of a company changes over time. For example, a database may start out as a non-critical application yet grow to become mission critical as more of the business depends on it for daily operation. Conversely, a database that was once critical to daily operation of the business becomes less important as it is replaced by newer systems. With current tape-based data protection schemes, it's difficult to increase or decrease the degree of protection that is applied to specific sets of primary storage data as their value to the corporation changes over time, particularly when that data that has already been protected to hundreds or thousands of backup tapes.

While magnetic tape provides good sequential access performance for today's backup software products, its access time to random data is approximately a thousand times slower than magnetic disk. This limits the use of tape to data streaming applications like backup/archiving.

SUMMARY OF THE INVENTION

The present invention is associated with computer primary disk storage systems and the ongoing protection of data on that primary disk storage system from various forms of data loss or corruption. One embodiment of the invention provides a data protection system. The system includes a fileserver having: a filter driver; a file system in communication with the filter driver; a policy cache; and a mirror service in communication with the filter driver and with the policy cache.

The filter driver intercepts input/output activity initiated by client file requests and maintains a list of modified and created files since a specified snapshot (a snapshot is the capturing of a set of data from a specified set of storage at a particular point in time). The file system stores client files. The policy cache stores protection policies associated with each share. A share is created on a fileserver as a directory or folder of storage capacity. The mirror service prepares modified and created files in a share to be written to a repository as specified in the protection policy associated with the share.

The fileserver can further include a fileserver API coupled to the mirror service and a fileserver file transfer module in communication with the file system. At least one repository communicates with the fileserver through the fileserver API. The fileserver file transfer module transfers files from the file system to at least one repository.

The fileserver can also include a location cache in communication with the mirror service and a location manager coupled to the location cache. The location cache indicates which repository should receive an updated version of an existing file and the location manager updates the location cache when the system writes a new file to a specific repository node.

In one embodiment, the system further includes a local repository and a remote repository. The local repository can include: a local repository node API adapted for communicating with the fileserver; a local repository file transfer module in communication with the fileserver file transfer module and adapted for sending or receiving files from the fileserver file transfer module; a data mover in communication with the local repository API and operative to supervise the replication of files from the fileserver to the local repository; and a protection policy component in communication with the data mover and operative to determine whether new versions of existing files should be compressed and whether older versions of existing files should be maintained.

The remote repository can include: a remote repository node API adapted for communicating with another repository node; a remote repository file transfer module in communication with the local file transfer module and adapted for sending and receiving files; a data mover in communication with the remote repository API and operative to supervise the replication of files from the local repository to the remote repository; and a protection policy component in communication with the data mover and operative to determine whether new versions of existing files should be compressed and whether older versions of existing files should be maintained.

Another embodiment of the invention provides a method for protecting data. The method includes: storing a version of a first file within a share on a primary disk storage system; examining a protection policy associated with the share to determine where and how to protect files associated with the share; and replicating the version of the first file to repositories specified by the protection policy, the specified repositories including at least one local repository and at least one remote repository.

In one embodiment, the version of the first file is the first version. The method can further include applying reverse delta compression to successive versions of the first file as new versions are stored in the repositories. Applying reverse delta compression to successive version of the first file can include, in response to the creation of a second version of the first file: replacing the first version of the first file replicated in the local repository with a reverse delta compressed version representing the compressed difference between the first version and the second version and replicating the second version in the local repository; transmitting a difference file to the remote repository; and in the remote repository, applying the difference file to the previous version of the file to store the second version and a reverse delta compressed version representing the difference between the first version and the second version.

The method can further include examining a protection policy associated with the share to determine where and how to protect files associated with the share. Furthermore, the method can include determining the location of repositories and the number of replicas for each repository, and/or determining whether to purge a file from repositories after the file has been deleted from a share. As noted above, a share is created on a fileserver as a directory or folder of storage capacity.

BRIEF DESCRIPTION OF THE DRAWINGS

FIG. 1 is a diagram of a deployment of one embodiment of the present invention across three data centers.

FIG. 2 illustrates how one embodiment of a protection policy creates a relationship between a fileserver share and associated repositories such as those shown in FIG. 1.

FIG. 5 shows a first step of one embodiment for managing replication of data across multiple repositories.

FIG. 6 shows a second step of one embodiment for managing replication and versions across multiple repositories.

FIG. 7 shows a third step of one embodiment for managing replication and versioning across multiple repositories.

FIG. 8 shows a screenshot of one embodiment of a user interface for the protection policy of FIG. 2.

FIG. 9 shows one embodiment of the apparatus and the software components that are used to protect new client data to a local repository node.

FIG. 10 shows one embodiment of the apparatus that replicates data among repositories.

DETAILED DESCRIPTION OF THE DRAWINGS

Figure 3:
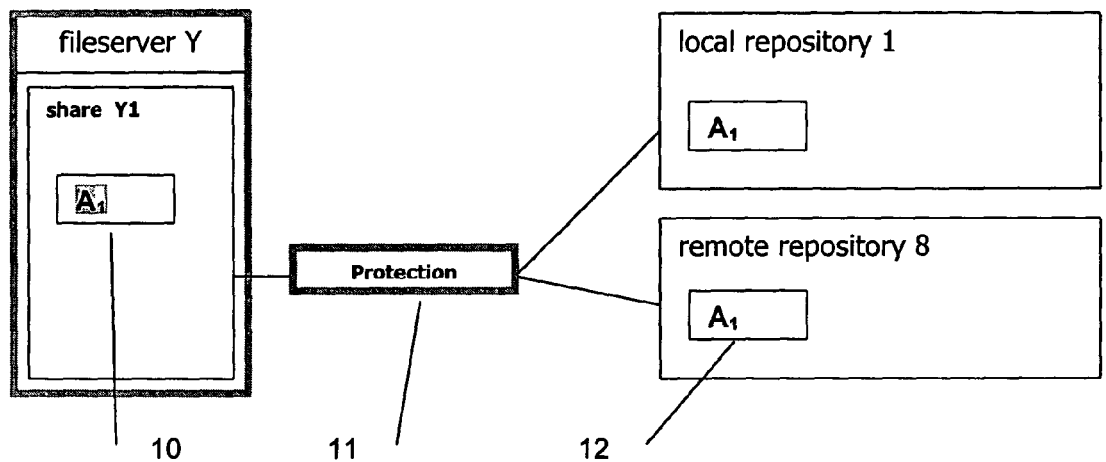
FIG. 3 illustrates one embodiment of the performance of data replication according to a protection policy.

FIG. 1 is a diagram that illustrates the present invention of an integrated primary data storage and data protection system. Fileservers 4 provide primary data storage capacity to client systems 5 via standard network file system (NFS), file transfer protocol (FTP) or common Internet file system (CIFS) protocols. The apparatus is designed to operate among two or more data centers 1 shown in FIG. 1 as Data Centers A, B, D. Two or more repositories 3 deployed across these data centers provide storage capacity and data management processing capability to deliver complete data protection for their associated fileserver primary storage systems. The apparatus leverages metropolitan area network (MAN) or wide area network (WAN) internet protocol (IP) networking 2 to allow repositories to send and receive data that must be replicated from one repository to another. By having data replicated to a local repository and at least one remote repository from the originating fileserver, these repositories act as a replacement for traditional on-site and off-site tape storage systems and tape vaulting services.

FIG. 2 illustrates the association between a fileserver 6 and the two or more repositories 8 that may be deployed across data centers. All primary data storage activity occurs between one or more clients and one or more fileservers through a NFS, FTP, or CIFS share 7. A share is created on a fileserver as a directory or folder of storage capacity. The contents of this shared directory or folder is accessible by multiple clients across a local area network. For example, in the Microsoft Windows environment, CIFS shares appear as storage folders within LAN-connected servers under "My Network Places" of the Windows Explorer user interface. For UNIX environments, shares are accessed through mount points which define the actual fileserver and folder where data will be stored as well as a virtual folder of the local client system's filesystem. These shares allow the primary storage capacity of the fileserver to be shared and securely partitioned among multiple clients. Because this apparatus is both a primary data storage and data protection system, the administrator defines how each share of a fileserver will be protected across two or more repositories through the creation of a unique protection policy 9 for that share. In one embodiment, this protection policy defines which repositories the system will use to protect each share's data. In one embodiment it also defines how often data protection will occur, how many replicas the system will maintain within each repository, and how the system should maintain modifications to share data. On a periodic basis, each fileserver examines the protection policy for its shares and, when appropriate, the fileserver captures all recent changes to a share's files and stores and protects these files within two or more repositories.

FIG. 3 is a diagram that illustrates how a client file is stored and protected after first being created. In this example, the file is called A, and the subscript "1" denotes that is the first version of the file. This file is initially stored within a share on a fileserver's primary disk storage system by the client. To determine where and how to protect file $A_1$ the protection policy 11 that was previously defined for the fileserver share in which file $A_1$ was placed is examined. File $A_1$ is then replicated 12 to all of the protection policy's designated repositories. In this example, file $A_1$ is replicated to repository 1 and repository 8. This replication takes place on a periodic basis as defined by the backup frequency indicated in the protection policy.

Figure 4:
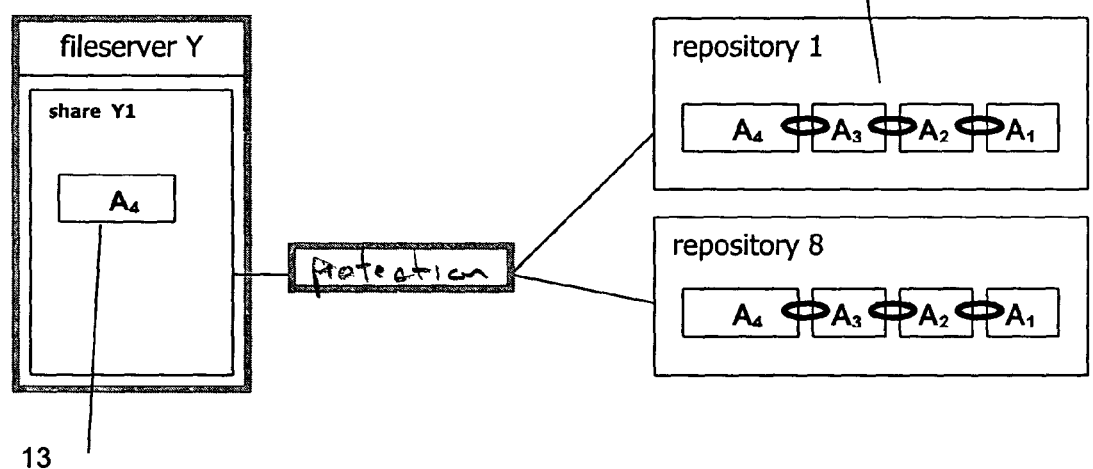
FIG. 4 is a diagram that shows how one embodiment of the apparatus manages versions of files.

FIG. 4 is a diagram that illustrates the activity that occurs according to one embodiment when an existing file is modified by a client. $A_1$ is the first version of file A and $A_2$, $A_3$, . . . represent successive modifications to file A. When file A is modified on the client system, the fileserver retains only the latest version of the file so that all clients requesting file A receive the most updated version. All earlier versions of file A are maintained in local and remote repositories. In the example in FIGS. 3 and 4, the original file was modified 3 more times as denoted by the fileserver's retention of file version $A_4$ In one embodiment, the subscripts the system uses to describe versioning are not visible to client applications. The file that resides on the fileserver is accessed as file A. Within each designated repository, for every file that is created and then modified, a version chain 14 is created to allow the current version and all earlier versions of a file to be retained. There are many reasons why customers might need to access the current or earlier versions of a file:

If the client or application accidentally deletes the latest version from the fileserver, that latest version can be restored to the fileserver using any of the replicas of the latest version that have been stored in the repositories. A deletion of a file on a fileserver does not result in a deletion of that file from its repositories since repositories are designed to mimic secure backup tapes.

A fileserver file may become corrupted by a virus or hardware failure. In this case, the latest version can be restored from any of the repositories that maintain that file's replicas and versions.

A client or application might require the content of an earlier version of a particular file. For example, a user might want to know when a particular change to a document was made or they may need to access an earlier version of a file for reference or modification.

FIG. 5, FIG. 6 and FIG. 7 represent a time-sequenced set of diagrams that illustrate the activities that occur when reverse delta compression is enabled for a share through its protection policy. Reverse delta-compression takes the difference between two files and compresses this difference. It retains the latest version of the file in its uncompressed form and all earlier versions in reverse delta compressed form. The latest version of a file is maintained in an uncompressed form since it is the most likely version to be requested for a recovery operation and not having to decompress the file minimizes the time to recover data. To recreate an earlier version of a file, the reverse delta decompression algorithm starts with the latest version of the file and decompresses backward in a chain of versions until the desired file is reached. One embodiment of the present invention allows reverse delta compression to be applied to successive versions of a file as new versions are stored in repositories.

In FIG. 5, a file called A has been created in a fileserver by a client. It has been stored in a local repository and, since it is the first version of a file, it is replicated to the remote repository across a MAN/WAN connection in its full, uncompressed form.

In FIG. 6, file A is modified, and a version chain for that file created. The original $A_1$ version that was stored in the local repository is replaced by just the reverse delta compressed difference in bytes between version $A_2$ and version $A_1$, which is represented by $A_{1D}$. The fileserver just retains the latest version of the file A, $A_2$ so that clients only have access to the latest version. Also in FIG. 6, the much smaller difference file, $(A_2-A_1)$, represented by the symbol $\Delta$, is transmitted across the metropolitan or wide area network to a remote repository.

In FIG. 7, file version $A_2$ can be created in the remote repository 8 by applying the difference file just received, $(A_2-A_1)$, to the previous version of the file in that repository, $A_1$. FIG. 7 displays the final completed replication and versioning of file A across its designated repositories 17. Observe that the latest version is maintained in an uncompressed form and all earlier versions are stored in a reverse delta compressed form. It is worth reiterating that $A_{1D}$ represents the reverse delta compressed difference between version $A_2$ and version $A_1$, while $(A_2-A_1)$ represents simply the difference between version $A_2$ and version $A_1$.

FIG. 8 is a screenshot of one embodiment of the present invention's protection policy. There is a unique protection policy defined by a storage administrator for each share of each fileserver. Before arriving at the protection policy screen, a storage administrator creates a share and allows it to be accessible by CIFS and/or NFS and/or FTP. Once a new share is created, the protection policy screen is displayed. Within this screen, the storage administrator can specify the following data protection parameters:

Protect this share 18—this checkbox is normally checked indicating the data in this share should be protected by repositories. There are certain client applications that might choose to use a fileserver for primary storage, yet continue to protect data using third party backup or archiving products. If this checkbox is left unchecked, all other options in the protection policy user interface are disabled.

Protection Management—Backup Frequency 19—this option determines how often a fileserver share's data will be protected in the local and remote repositories. In one embodiment, the backup frequency intervals can be selected from a list of time intervals which include: 15 minutes, 30 minutes, 1 hour, 2 hours, 3 hours, 4 hours, 6 hours, 8 hours, 12 hours and 24 hours. All backup frequency intervals are anchored to 12:00 midnight of each fileserver's local time-zone. Setting the backup frequency to 24 hours is similar to performing traditional daily incremental backups. Setting this interval to 15 minutes allows versions of files that change often during the day to be protected on 15 minute intervals. Only files that have changed since the last backup occurred are saved in repositories.

Protection Management—Number of replicas per repository. This feature allows a storage administrator to determine how many replicas 20 of data to create within each repository 21 when a share is protected. Minimally, there must be one replica stored in a repository that is local to the share's fileserver. It's possible to maintain multiple replicas within a single repository. In this case, replicas are maintained on different repository nodes of a repository to ensure continued access to a replica in the event of a single repository node failure or network failure. The location and number of replicas can be changed over time. To increase data availability for data that is increasing in criticality, more replicas per repository and additional repositories may be specified. For data that is decreasing in importance, fewer replicas may be maintained in the repositories, which makes more storage capacity available to other shares that are also using those repositories.

Version Management—Keep Version History 22—this checkbox should be checked for shares whose file content is regularly being updated. When checked, the specified repositories will maintain a version chain of all changes that were identified at each backup frequency interval. For shares of data that have unchanging file content, this checkbox can be unchecked.

Version Management—Version Compression 23—the three compression options are to not compress, to reverse delta compress or to apply simple file compression to a share's files. File compression refers to a variety of techniques known to those of skill in art for compressing a file so that it does not take up as much storage space as an uncompressed file. Delta compression typically provides the highest compression ratio for shares whose files are regularly being modified.

Version Management—Version Compaction 24—compaction provides a means of removing versions of files based on the version's age. For example, the version compaction option for a file share may be configured to maintain only one monthly version of a file after a year, one weekly version of a file that's older than 6 months and one daily version of a file that's older than 1 month. All "extra" versions can be automatically purged from repositories, which, in turn, makes more storage capacity available for new versions of files.

Advanced Options—Purge on Delete 25—when this option is checked, a policy component, e.g., a policy cache (shown as element 34 in FIG. 9) on the fileserver causes files that are deleted from a share on the fileserver to also be purged from repositories as well. More specifically, the policy component (element 34 in FIG. 9) on the fileserver communicates with a policy component (element 44 in FIG. 9) on a repository to implement this option. This option is effective with applications like third party backup, where some of the replicas and versions that are being retained by repositories are no longer needed to satisfy a that application's recovery window and may be purged from all repositories.

Advanced Options—Caching Level 26—this allows the storage administrator to set the approximate percentage of client data that will be cached on a fileserver. Normally, this option is set to "Optimize for Read" to allow the maximum number of most-recently accessed files to be available to client applications at the highest performance levels. All least recently used data is maintained in two or more repositories. Conversely, the caching level can be set to "Optimize for Write", which reduces the amount of cached data available to clients but provides consistently high levels of available storage capacity to write-mostly applications like third party backup. In this mode, by aggressively moving data off of a fileserver into repositories, the application sees the fileserver as a storage device with virtually infinite capacity.

FIG. 9 and FIG. 10 illustrate modules used to protect data files created by a client using a local repository and a remote repository. FIG. 9 displays one embodiment of the apparatus and software modules of the present invention that are associated with protecting client files to a local repository. The apparatus includes a fileserver 27 and a single local repository node 28. Clients access a fileserver via the client IP-based (Internet Protocol) network 29 and communicate with the fileserver using NFS, CIFS or FTP protocols. All fileservers and all repository nodes are interconnected by an internal IP-based (Internet Protocol) network 30. Current client files reside on a fileserver's filesystem 32.

The filter driver 31 intercepts all input/output activity initiated by client file requests. The fileserver software maintains a list of all modified or created files since this last snapshot occurred. Snapshot intervals can range from 15 minutes to 24 hours, based on the backup frequency 19 of the protection policy. On the schedule of the backup frequency, the mirror service 33 prepares all modified files in a share to be put into the repositories 21 (shown in FIG. 8) that are specified in that share's protection policy.

The protection policies are stored and replicated across multiple repositories, and they are cached and regularly updated within each fileserver in the protection policy cache 34. For example, if a share's protection policy has its backup frequency set to one hour, on the transition to the next hour, the mirror service 33 initiates a backup of all changed files in the last hour to a local repository 28.

For all new files, any repository node of the local repository can be used to hold a replica of a file. For files that have been modified, the mirror service directs new versions of the existing file to the same repository node as prior versions of that file.

The mirror service queries the location cache 36 to determine which repository node should receive an updated version of an existing file. This location cache is updated regularly by the location manager 35 when the fileserver writes files to specific repository nodes. Once the location manager identifies all destination repository nodes for each file of a share for the latest collection of updated or created files, the fileserver communicates to each local repository via a fileserver API 37 and a repository node API 38.

Each repository node's data mover 39 supervises the replication of files from the fileserver to its repository node. The fileserver file transfer module 40 transfers files from the fileserver filesystem to each repository node's file transfer 41 module. Once the files are replicated to specific disk drives within a repository node, its location manager 42 updates its location cache 43 with repository node location information.

For all files that arrive at a repository node that are modified versions of existing files, the share's protection policy 44 version management settings are reviewed to determine whether new versions should be compressed and whether older versions should be maintained. The version service 45 is responsible for managing all policy-based compression and decompression, and purging versions based on the "keep only one version" option of a share's protection policy.

At this point in the description, client data is only replicated to a local repository. FIG. 10 illustrates one embodiment of modules that implement a process that protects data to one or more remote repositories to completely protect client data from site disaster. FIG. 10 displays a local repository node 46 that, from the actions described in FIG. 9, holds the first replica of data. FIG. 10 also shows a remote repository node 47. These are connected to each other across a metropolitan or wide-area network 48. In one embodiment, all data that is transferred between local and remote repositories may be secured by virtual private networking (VPN) 49 encryption. The local repository node's replication service 50 is responsible for reviewing the protection policy 51 for all files that were just created as part of the recent fileserver backup. Each repository node acts as a peer of other repository nodes. Based on the protection policy each repository node manages the movement of files among all repository nodes using repository node APIs 52, 53, data movers 54, and file transfer modules 55, 56. Once the data is replicated to remote repositories, the location manager 57 of each repository node updates the location cache 58 to track where files are maintained within that repository node. The version service 59 of the remote repository node manages file version compression, and compaction according to the protection policy.

Having thus described at least one illustrative embodiment of the invention, various alterations, modifications and improvements are contemplated by the invention including the following: the specific number and arrangement of fileservers and repositories can be modified; the number of repository nodes on an individual repository can be modified; and the specific presentation and components of the illustrated protection policy user interface can be modified. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A data protection system, comprising:
  a fileserver configured to contain shares of data and to be in communication with at least one local repository that is in communication with at least one remote repository, wherein two or more repositories are configured to store a replica of a file, wherein each repository includes multiple repository nodes, at least one repository node of each repository is configured to store the replica of the file, wherein a storage location and a number of replicas in each repository is configured to be changed over time by a user;
  wherein based on a criticality of the file, the number of stored replicas of the file is increased or decreased in at least one repository;
  wherein shares of data are directories or folders of storage capacity created on the fileserver;
  the fileserver includes:
    a filter driver configured to intercept input or output activity initiated by client file requests, including modification of any existing stored files and creation of new files as modification of any existing stored files and creation of new files occur, and further configured to capture a snapshot of a set of the shares of data at a particular point in time and to maintain a list of modified and created files since a last snapshot occurred;
a file system in communication with the filter driver and configured to store client files;
the fileserver is configured to store a unique protection policy for each share of data on the fileserver, the protection policy defines:
repositories used to protect each share of data;
frequency of data protection;
number of replicas of each file that are maintained in each repository; and,
maintenance of modifications to each share of data;
based on the definitions in the protection policy, the filter driver is configured to capture the snapshot.

2. The system of claim 1, wherein the fileserver further comprises:
a location cache configured to determine based on the protection policy which repository will be used to protect each share of data; and
a location manager coupled to the location cache and configured to update the location cache when the fileserver protects a new share of data in a specific repository node.

3. The system of claim 2, wherein the local repository in communication with the fileserver is adapted for receiving files from the fileserver;
the local repository is further configured to receive replicated files from the fileserver; and
the local repository includes a protection policy component configured to determine whether new versions of existing files should be compressed and whether older versions of existing files should be maintained.

4. The system of claim 3, wherein the remote repository in communication with the local repository is adapted for receiving files from the local repository;
the remote repository is further configured to receive replicated files from the local repository; and
the remote repository includes a protection policy component configured to determine whether new versions of existing files should be compressed and whether older versions of existing files should be maintained.

5. A method for protecting data comprising:
providing a fileserver configured to contain sets of files and to be in communication with at least one local repository that is in communication with at least one remote repository, wherein two or more repositories are configured to store a replica of a file;
wherein sets of files are directories or folders of storage capacity created on the fileserver;
the fileserver including
a filter driver configured to intercept input or output activity initiated by client file requests, including modification of any existing stored files and creation of new files as modification of any existing stored files and creation of new files occur;
a file system in communication with the filter driver and operative to store client files;
storing a version of a file within a set of files on the fileserver;
using the filter driver, capturing a snapshot of the set of files at a particular point in time based on a backup frequency defined in a protection policy;
using the filter driver, maintaining a list of modified and created files since last captured snapshot;
examining the protection policy associated with the set of files to determine where and how to protect files associated with the set of files;
wherein the protection policy defines:
repositories used to protect each set of files;
frequency of data protection;
number of replicas of each file that are maintained in each repository; and,
maintenance of modifications to each set of files; and,
replicating the version of the file to two or more repositories specified by the protection policy, wherein the repositories include at least one local repository and at least one remote repository, wherein a storage location and a number of replicas of the version of the file is configured to be changed over time by a user;
wherein each repository includes multiple repository nodes, at least one repository node of each repository is configured to store the replica of the file;
wherein based on the criticality of the file, the number of stored replicas of the file is increased or decreased in at least one repository;
wherein the protection policy is configured to be uniquely defined for each set of files.

6. The method of claim 5 wherein the file is configured to have at least one version.

7. The method of claim 6 wherein the method further comprises:
applying reverse delta compression to the version of the file when a successive version of the file is stored in the repository.

8. The method of claim 7 wherein the step of applying reverse delta compression comprises
creating another version of the file, wherein the another version of the file is a version of the file successive to the version of the file;
replicating the another version of the file into the local repository and the remote repository;
replacing the replicated version of the file in the local repository with a reverse delta compressed version representing a difference between the version of the file and the another version of the file and replicating;
transmitting the reverse delta compressed version to the remote repository; and
in the remote repository, replacing the version of the file with the reverse delta compressed version to store the another version and the reverse delta compressed version.

9. The method of claim 5 wherein examining a protection policy associated with the set of files to determine where and how to protect files associated with the set of files comprises:
determining the location of repositories and a number of replicas of the files to be stored in each repository.

10. The method of claim 5 wherein examining a protection policy associated with the set of files to determine where and how to protect files associated with the set of files comprises:
determining whether to purge the file from a repository after the file has been deleted from a set of files.

11. The method of claim 5 wherein examining a protection policy associated with the set of files to determine where and how to protect files associated with the set of files comprises:
determining whether to keep a version history of a file in the set of files.

12. The method of claim 5 wherein examining a protection policy associated with the set of files to determine where and how to protect files associated with the set of files comprises:
determining a specified backup frequency for a repository.

13. The method of claim 5 wherein examining a protection policy associated with the set of files to determine where and how to protect files associated with the set of files comprises:

determining a specified type of compression for a file in the set of files.

14. The method of claim 5 wherein examining a protection policy associated with the set of files to determine where and how to protect files associated with the set of files comprises:
determining a specified caching level of a repository.

15. A data protection system comprising:
a fileserver configured to contain shares of data and to be in communication with at least one local repository that is in communication with at least one remote repository, wherein two or more repositories are configured to store a replica of a file, wherein each repository includes multiple repository nodes, at least one repository node of each repository is configured to store the replica of the file, wherein a storage location and a number of replicas in each repository is configured to be changed over time by a user;
wherein based on a criticality of the file, the number of stored replicas of the file is increased or decreased in at least one repository;
wherein shares of data are directories or folders of storage capacity created on the fileserver;
said fileserver includes:
filter driver means for intercepting input or output activity initiated by client file requests, including modification of any existing stored files and creation of new files as modification of any existing stored files and creation of new files occur, and for capturing a snapshot of a set of the shares of data at a particular point in time and for maintaining a list of modified and created files since a last snapshot occurred;
file system means in communication with the filter driver, the file system means for storing client files;
the fileserver is configured to store a unique protection policy for each share of data on the fileserver, the protection policy defines:
repositories used to protect each share of data;
frequency of data protection;
number of replicas of each file that are maintained in each repository; and,
maintenance of modifications to each share of data;
based on the definitions in the protection policy, said filter driver means is configured to capture the snapshot.

16. The system of claim 1, wherein said fileserver is configured to
backup said modified files into repositories identified in said protection policy based on said backup frequency; and
store a latest version of a file in a repository where a prior version of said file is stored;
determine a difference between said latest version of said file and said prior version of said file;
apply reverse delta compression to said difference;
replace said prior version of said file with said reverse delta compressed difference between said latest version and said prior version of said file.

17. The system of claim 1, wherein, based in the protection policy, the fileserver is configured to determine the location of repositories and a number of replicas of the files to be stored in each repository.

18. The system of claim 1, wherein, based on the protection policy, the fileserver is further configured to determine whether to purge a file from a repository after the file has been deleted from a set of files.

19. The system of claim 1, wherein, based on the protection policy, the fileserver is further configured to determine whether to keep a version history of a file in the set of files.

20. The system of claim 1, wherein, based on the protection policy, the fileserver is further configured to determine a specified backup frequency for a repository.

21. The system of claim 1, wherein, based on the protection policy, the fileserver is further configured to determine a specified type of compression for a file in the set of files.

22. The system of claim 1, wherein, based on the protection policy, the fileserver is further configured to determine a specified caching level of a repository.

23. The system of claim 15, wherein the fileserver further includes
backup means for backing up the modified files into repositories identified in the protection policy based on the backup frequency;
storage means for storing a latest version of a file in a repository where a prior version of the file is stored;
means for determining a difference between the latest version of the file and the prior version of the file;
means for applying reverse delta compression of the difference; and
means for replacing the prior version of the file with the reverse delta compressed difference between the latest version and the prior version of the file.

* * * * *